(12) United States Patent
Zhou et al.

(10) Patent No.: US 7,570,317 B2
(45) Date of Patent: Aug. 4, 2009

(54) FLAT PANEL DISPLAY WITH WIRE FIXING STRUCTURE

(75) Inventors: Tong Zhou, Shenzhen (CN); Kun Le, Shenzhen (CN); Hua Xiao, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 227 days.

(21) Appl. No.: 11/642,044

(22) Filed: Dec. 18, 2006

(65) Prior Publication Data

US 2007/0139578 A1 Jun. 21, 2007

(30) Foreign Application Priority Data

Dec. 16, 2005 (TW) .............................. 94144852 A

(51) Int. Cl.
*G02F 1/1333* (2006.01)
(52) U.S. Cl. .......................................... 349/58; 349/60

(58) Field of Classification Search .................. 349/58, 349/60
See application file for complete search history.

(56) References Cited

U.S. PATENT DOCUMENTS

| | | | |
|---|---|---|---|
| 4,566,187 A | 1/1986 | Chen | |
| 5,652,606 A * | 7/1997 | Sasaki et al. | ................. 345/204 |
| 5,959,253 A | 9/1999 | Shinchi | |
| 7,271,997 B2 * | 9/2007 | Kee et al. | ............... 361/679.27 |
| 2004/0125268 A1* | 7/2004 | An | ............................... 349/58 |
| 2006/0152664 A1* | 7/2006 | Nishio et al. | ................. 349/150 |

* cited by examiner

*Primary Examiner*—Frank G Font
*Assistant Examiner*—Jerry Blevins
(74) *Attorney, Agent, or Firm*—Wei Te Chung

(57) ABSTRACT

An exemplary flat panel display includes a back cover having a receiving space, and conductive wires accommodated in the receiving space. The back cover includes an inner surface corresponding to the receiving space. Typically, plural fixing elements for fastening the conductive wires are arranged on the inner surface, which can secure the conductive wires on the back cover.

11 Claims, 5 Drawing Sheets

US 7,570,317 B2

FLAT PANEL DISPLAY WITH WIRE FIXING STRUCTURE

BACKGROUND OF THE INVENTION

1. Field of the Invention

The present invention relates to flat panel displays, and particularly to a flat panel display with conductive wires fastened in a receiving space inside the flat panel display.

2. General Background

A popular kind of flat panel display is the liquid crystal display (LCD). LCDs generally have advantages of lightness in weight, a thin profile, flexible sizing, and low power consumption. For these reasons, LCDs are widely used in products such as LCD monitors, laptops, personal digital assistants, mobile phones, and so on. In order to integrate more functions into an LCD device (such as an LCD monitor or a laptop), equipment such as speakers, a camera, and a USB (Universal Serial Bus) port can be included. Typically, this kind of equipment is electrically connected to a printed circuit board of the LCD device with wires.

A conventional LCD panel of an LCD monitor is shown in FIG. 9. The LCD panel 1 includes a front cover 11, a back cover 12, a display module 15, a printed circuit board (PCB) 13, and a pair of speakers 14a, 14b. A receiving space is formed between the front cover 11 and the back cover 12, for receiving the display module 15, the PCB 13, and the speakers 14a, 14b.

The front cover 11 defines a central opening 111, corresponding to a display region 151 of the display module 15. The back cover 12 includes an inner side surface 121. The speakers 14a and 14b are located at two ends of a lower side of the inner side surface 121. Each speaker 14a and 14b is connected with a respective wire 16. The wires 16 electrically connect to the PCB 13 through a connector 18. In order to secure the wires 16 in a proper manner, several pieces of adhesive tape 19 are used to attach the wires 16 onto the inner side surface 121 of the back cover 12.

During assembly of the LCD panel 1, a roll of adhesive tape 19 is needed. In general, an operator cuts or tears pieces of adhesive tape 19 off from the roll one by one, and uses the pieces of adhesive tape 19 to fix the wires 16 on the inner side surface 121 of the back cover 12. Typically, several pieces of adhesive tape 19 are needed to attach the wires 16 onto the back cover 12 firmly. Overall, the conventional manual process for fixing the wires 16 on the back cover 12 is inconvenient and time-consuming.

SUMMARY

An exemplary of flat panel display includes a first cover, a second cover, a printed circuit board (PCB), and a display module. The first cover has a receiving space for receiving a wire. The first cover further includes a first surface, located corresponding to the receiving space. The first surface has a wire fixing structure for fastening the wire on the first cover. In the preferred embodiment, the wire fixing structure includes a post. The post can for example be cylindrical or a square prism. Additionally, the post usually has a protrusion extending from a free end thereof so as to secure the wire. Furthermore, when the wire fixing structure has three posts, an arrangement of those three posts is like an isosceles triangle. In this situation, lengths of the two equal sides and of the base side and of the height of the isosceles triangle are defined as "m", "L" and "h" separately where a compound ratio of the m:L:h can be 1.4:2:1. Moreover, a length of the wire fixing structure is defined as "p", and a compound ratio of "p" and "L" can be 1.5:2. Otherwise, the first cover is usually set with a plurality of speakers which are electrically connected by the wire and further electrically connected to the PCB. The display module is also electrically connected to the PCB. The first cover and the second cover are adapted to engagingly receive the display module and the PCB therebetween.

Other objects, advantages, and novel features of various embodiments of the present invention will become more apparent from the following detailed description when taken in conjunction with the accompanying drawings. In the drawings, all the views are schematic.

DETAILED DESCRIPTION OF PREFERRED EMBODIMENTS

Figure 1:
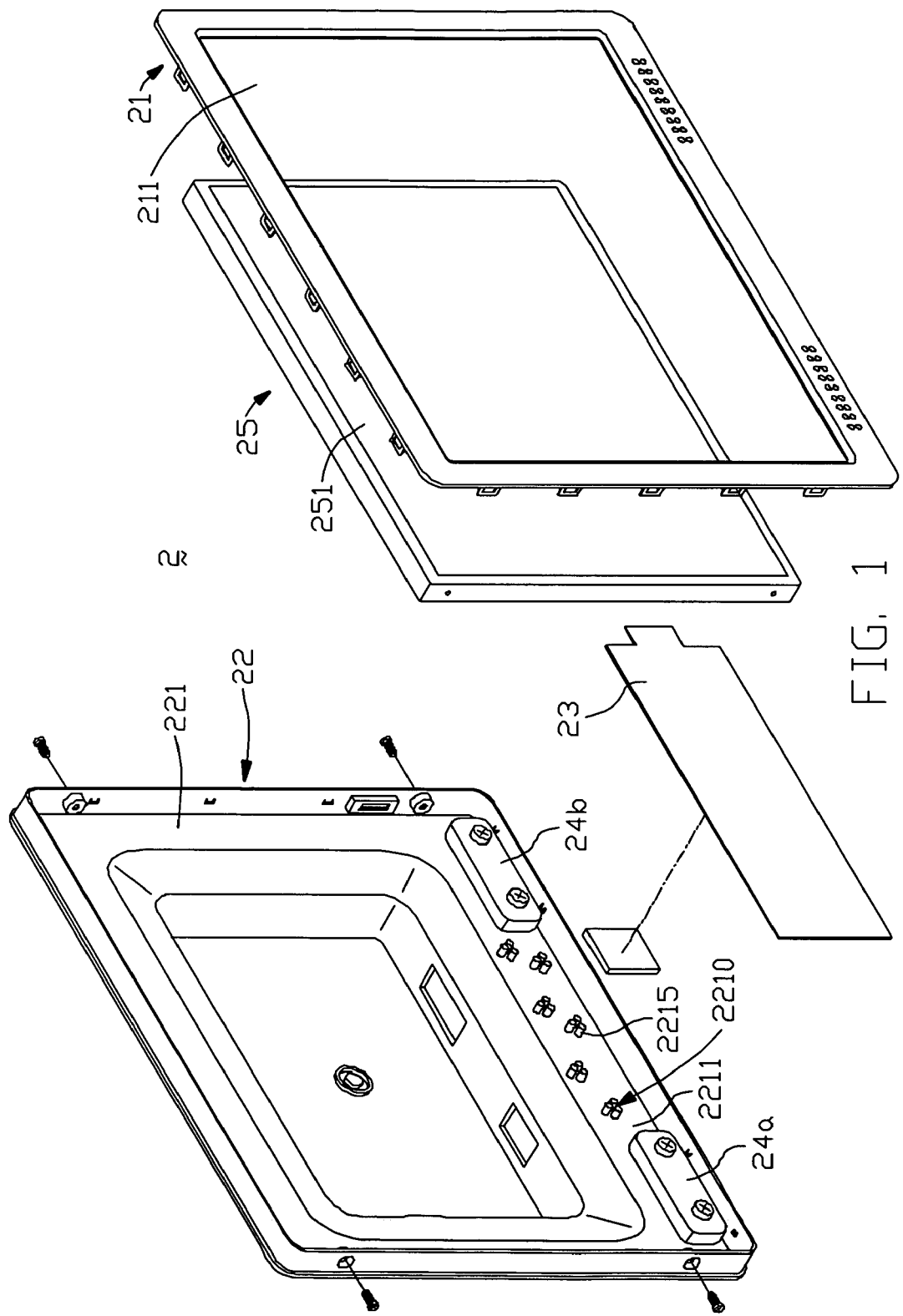
FIG. 1 is an exploded, isometric view of a liquid crystal display (LCD) panel according to an exemplary embodiment of the present invention, the LCD panel including a back cover, two speakers, a connector, and wires (not shown).

Referring to FIG. 1, this is an exploded, isometric view of a liquid crystal display (LCD) panel. The LCD panel is shown and described herein for the purposes of describing an exemplary embodiment of the present invention. It should be noted that other kinds of flat panel displays are also capable of embodying the principles of the present invention. The LCD panel 2 includes a front cover 21, a back cover 22, a display module 25, a printed circuit board (PCB) 23, and a pair of speakers 24a, 24b. The front cover 21 and the back cover 22 cooperatively form a receiving space, for receiving the display module 25, the PCB 23, and the speakers 24a, 24b. The front cover 21 defines a central opening 211, corresponding to a display region 251 of the display module 25.

The back cover 22 includes an inner side surface 221, which defines one side of the receiving space. The speakers 24a, 24b are located on opposite ends of a lower side 2211 of the inner side surface 221 respectively. In the exemplary embodiment, six wire fixing structures 2210 are provided in a zigzagged arrangement on the lower side 2211 of the inner side surface 221. Each wire fixing structure 2210 includes three posts 2215 provided in an isosceles triangle arrangement. In the illustrated embodiment, the posts 2215 are cylindrical. In alternative embodiments, the posts 2215 may for example be square prisms.

Figure 2:
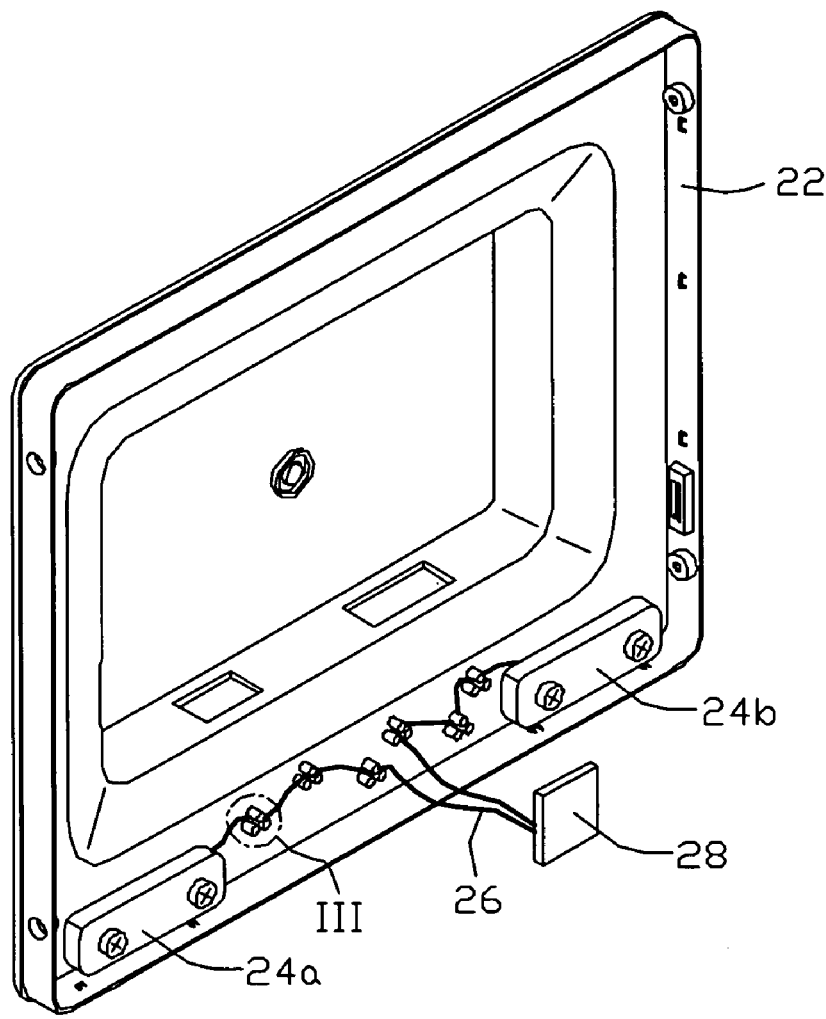
FIG. 2 is an assembled view of the back cover, the speakers, and the connector of FIG. 1, and also showing the wires.
Figure 3:
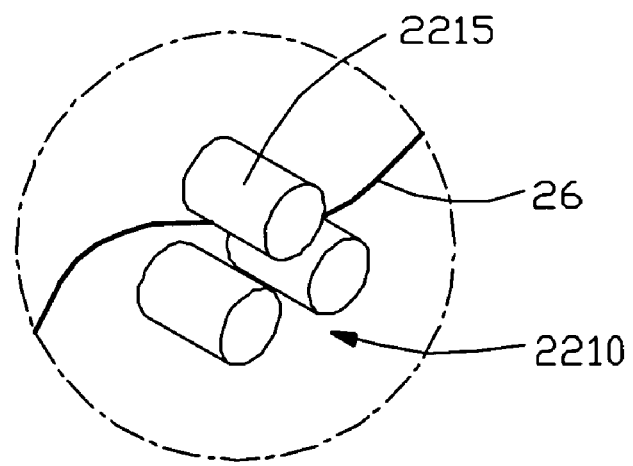
FIG. 3 is an enlarged view of a circled area III of FIG. 2.

Referring also to FIG. 2 and FIG. 3, the speakers 24a, 24b are each connected to a respective wire 26, and the wires 26 are connected to a connecter 28. The connecter 28 is in turn connected to the PCB 23. The wires 26 are secured through corresponding of the wire fixing structures 2210.

In each wire fixing structure 2210, a length of each of the two equal sides of the isosceles triangle is defined as "m", a width of the base side of the isosceles triangle is defined as "L", and a height of the isosceles triangle is defined as "h". In the case of the posts 2215 being cylindrical, a diameter of each post 2215 is "d". A length of each post 2215 (from the lower side 2211 of the inner side surface 221 to a free end of the post 2215) is defined as "p". According to a thickness of the wires 26, a compound ratio (m:L:h:d:p) of the posts 2215 in each wire fixing structure 2210 can be set as 1.4:2:1:1:1.5. For example, when the diameter "d" of each post 2215 is 3 mm, then the length "m" of the two equal sides is 4.2 mm, the width "L" of the base side is 6 mm, the height "h" of the isosceles triangle is 3 mm, and the length "p" of each post 2215 is 4.5 mm.

In the exemplary embodiment, when the wires 26 are secured through the wire fixing structures 2210, the wires 26 have a wavy arrangement adjacent to the lower side 2211 of the back cover 22. The wire fixing structures 2210 neatly fix the wires 26 of the speakers 24a, 24b in safe positions. In assembly of the LCD panel 2, unlike in conventional art, there is no need to use pieces of adhesive tape to attach the wires 26 on the back cover 22. Additionally, the posts 2215 and the back cover 22 can be conveniently formed as a single body, for example by an injection molding process. Hence, assembly times can be shortened, and costs reduced.

Figure 4:
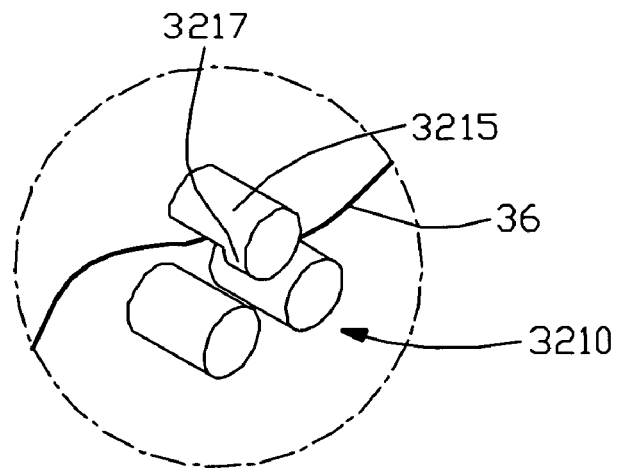
FIG. 4 through FIG. 7 are each similar to FIG. 3, but showing corresponding views in cases of LCD panels in accordance with respective alternative embodiments of the present invention.

In an alternative embodiment as shown in FIG. 4, a protrusion 3217 extends from a free end of a top one of three posts 3215 of each wire fixing structure 3210. The protrusion 3217 extends toward a middle of a base side of an isosceles triangle formed by the three posts 3215. The protrusion 3217 is defined by way of a cutout formed in the top post 3215. This configuration enables a wire 36 to be firmly held by the wire fixing structure 3210.

Figure 5:
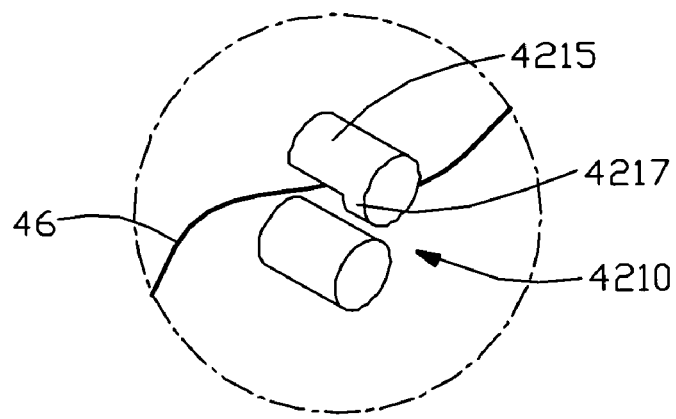

In another alternative embodiment as shown in FIG. 5, each wire fixing structure 4210 includes only two posts 4215. A lower one of the posts 4215 is cylindrical. An upper one of the posts 4215 has a protrusion 4217 extending toward the lower post 4215. This configuration enables a wire 46 to be firmly held by the wire fixing structure 4210.

Figure 6:
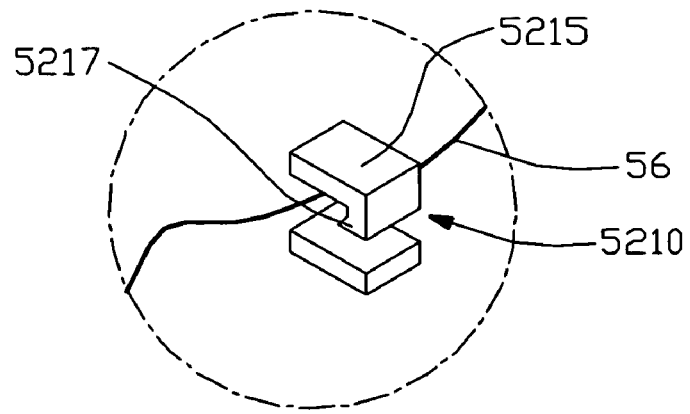

In a further alternative embodiment as shown in FIG. 6, each wire fixing structure 5210 has two posts 5215, which are generally prism-shaped. A top one of the posts 5215 has a hook 5217 extending down from a free end thereof and further extending toward the lower side 2211 of the back cover 22. This configuration enables a wire 56 to be firmly held by the wire fixing structure 5210.

Figure 7:
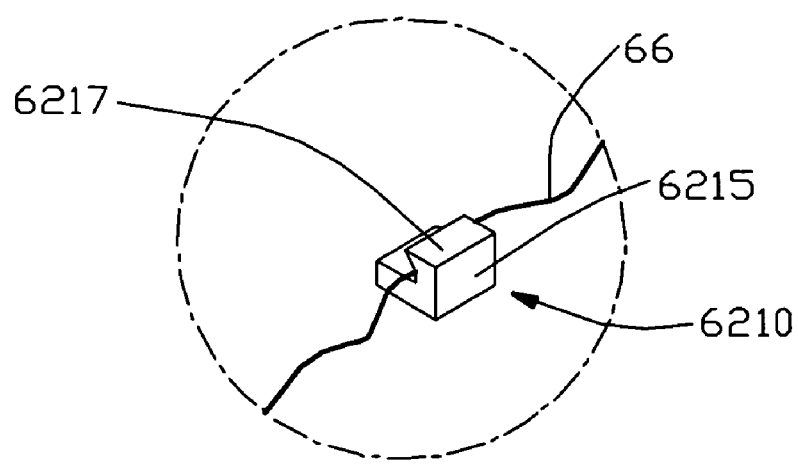

In a still further alternative embodiment as shown in FIG. 7, each wire fixing structure 6210 includes only a single post 6215. The post 6215 has a hook 6217 extending up from a free end thereof and further extending toward the lower side 2211 of the back cover 22. This configuration enables a wire 66 to be securely held by the wire fixing structure 6210.

Figure 8:
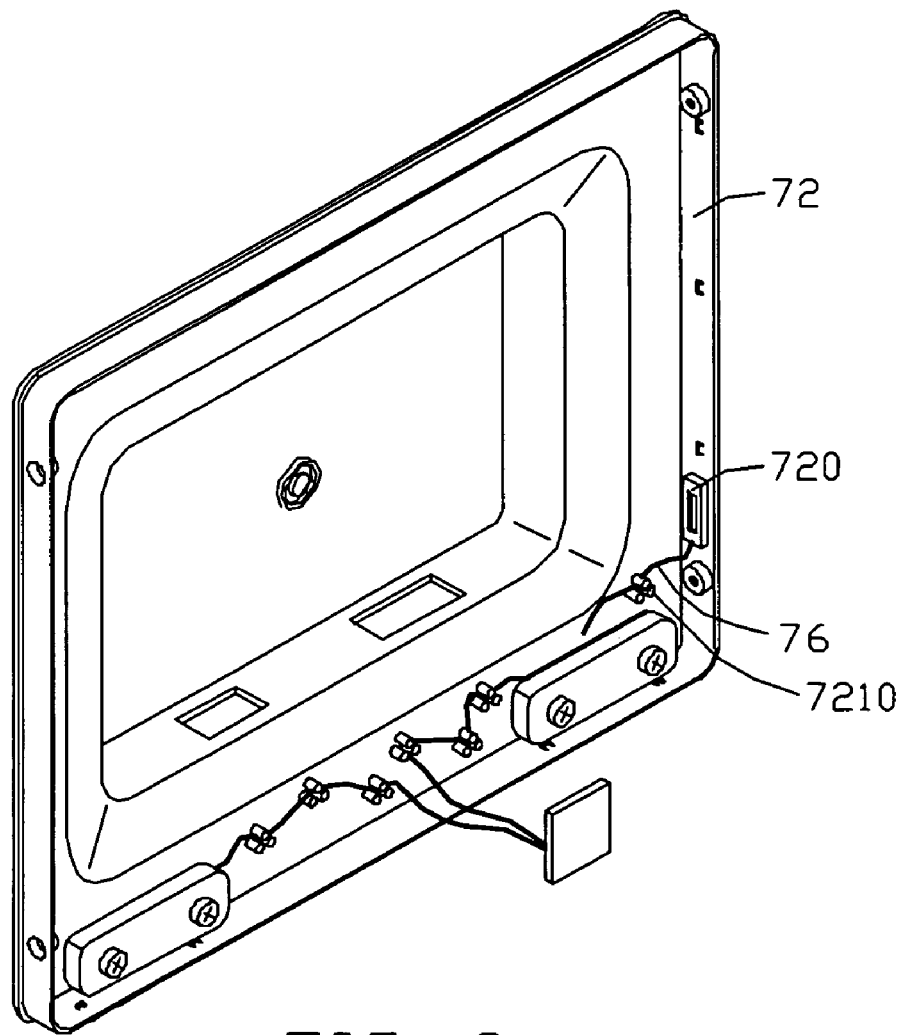
FIG. 8 is similar to FIG. 2, but showing a corresponding view in the case of an LCD panel in accordance with another alternative embodiment of the present invention.
Figure 9:
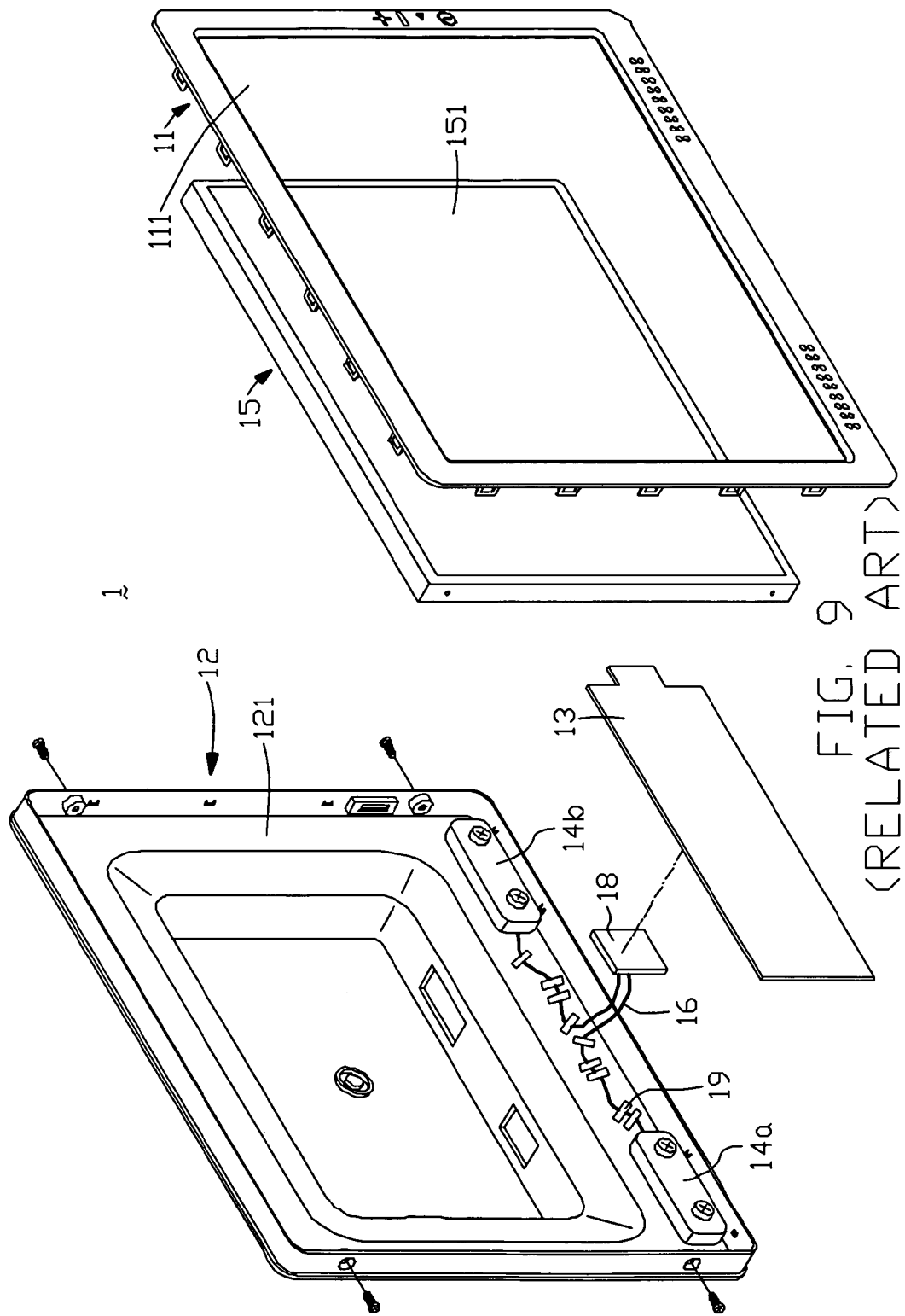
FIG. 9 is an exploded, isometric view of a conventional liquid crystal display panel.

In yet further alternative embodiments, the distribution of the wire fixing structures can be varied or added to according to need. For example, referring to FIG. 8, a USB port 720 may be set on one side of an inside surface of a back cover 72. The USB port 720 is connected to a PCB (not shown) through a wire 76 which is fixed by a wire fixing structure 7210.

The above-described LCD panel 2 and back covers 22, 72 can have various other alternative embodiments as required. For instance, the number of wire fixing structures can be varied according to the particular configuration of wires employed. For example, when the lengths of the wires are relatively short, as few as one or two wire fixing structures only may be necessary and sufficient. On the other hand, when the lengths of the wires are relatively longer, seven or more wire fixing structures may be required.

Furthermore, the number, arrangement, and configuration of the posts of each wire fixing structure can be varied according to need. For example, each wire fixing structure can have four posts or more than four posts. The posts can be semi-cylindrical, square prisms, triangular prisms, polygonal prisms, hollow cylinders, hollow prisms, etc. Additionally, the compound ratio of m:L:h:d:p can be adjusted accordance to the thickness of the wires used.

It is to be further understood that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A flat panel display, comprising:
a first cover, said first cover comprising a surface and at least one wire fixing structure provided at the surface, wherein said wire fixing structure comprises three posts arranged in an isosceles triangle, and is configured to secure a wire adjacent to the surface of said first cover.

2. The flat panel display as claimed in claim 1, wherein each of said three posts has at least one configuration selected from the group consisting of semi-cylindrical, a square prism, a triangular prism, a polygonal prism, a hollow cylinder, and a hollow prism.

3. The flat panel display as claimed in claim 1, wherein at least one of said three posts comprises a protrusion extending from a free end thereof, and the protrusion is configured to secure the wire between the protrusion and the surface of said first cover.

4. The flat panel display as claimed in claim 1, wherein a protrusion extends from a free end of one of said three posts toward a middle of a base side of the isosceles triangle.

5. The flat panel display as claimed in claim 1, wherein a length of each of two equal sides of the isosceles triangle is defined as "m", a width of a base side of the isosceles triangle is defined as "L", and a height of the isosceles triangle is defined as "h", and a compound ratio of m:L:h is 1.4:2:1.

6. The flat panel display as claimed in claim 5, wherein a length of each of said three posts is defined as "p", and a ratio of p:L is 1.5:2.

7. The flat panel display as claimed in claim 1, further comprising a plurality of speakers set at said first cover, wherein at least one of said speakers is configured to electrically connect with the wire.

8. The flat panel display as claimed in claim 1, further comprising a printed circuit board (PCB), wherein said PCB is configured to electrically connect with the wire.

9. The flat panel display as claimed in claim 8, further comprising a display module, wherein said display module is electrically connected to said PCB.

10. The flat panel display as claimed in claim 1, further comprising a Universal Serial Bus (USB port) set at said first cover, and a printed circuit board (PGB), wherein said USB port is configured to electrically connect to said PCB via the wire.

11. The flat panel display as claimed in claim 9, further comprising a second cover, wherein said first cover and said second cover cooperatively receive and hold said display module and said PCB therebetween.

* * * * *